July 13, 1943.    W. O. MIESSNER    2,324,315
THEME FINDER
Original Filed Nov. 26, 1938    2 Sheets-Sheet 1

*Fig. 1.*

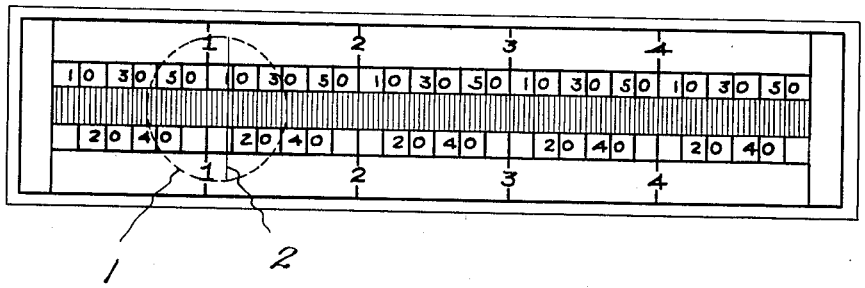

*Fig. 2.*

THIRD MOVEMENT
FIFTH SYMPHONY OF BEETHOVEN
VICTOR 9031-A
ALLEGRO (SCHERZO)
FIRST THEME - C MINOR    0:16ᵛ

CELLOS AND BASSES

SECOND THEME - BASIC MOTIVE - C MINOR    0:44ᵛ

STRINGS

| | |
|---|---|
| FIRST THEME IN B-FLAT MINOR BY CELLOS AND BASSES. | 1:03 |
| FIRST THEME, DISSOLVED. | 1:15 |
| SECOND THEME, C MINOR. | 1:27 |
| FIRST THEME, C MINOR. | 1:43 |

TRIO
A FUGUE SUBJECT IN C MAJOR BEGINNING IN CELLOS AND
BASSES.    2:13

CELLOS AND BASSES

| | |
|---|---|
| REPETITION OF THE EXPOSITION OF THE FUGUE. | 2:28 |
| HUMOROUS "FALSE STARTS" IN THE DEVELOPMENT SECTION OF THE FUGUE. | 2:44 |
| THE DEVELOPMENT GETS UNDER WAY. | 2:50 |
| MORE "FALSE STARTS." | 3:10 |
| THE RECAPITULATION BEGINS WITH A RESTATEMENT OF THE FIRST THEME IN C MINOR. | 3:44 |
| FIRST THEME REPEATED. | 3:58 |

INVENTOR.
WILLIAM OTTO MIESSNER
BY
C. R. Deller
ATTORNEY

July 13, 1943.  W. O. MIESSNER  2,324,315
THEME FINDER
Original Filed Nov. 26, 1938   2 Sheets-Sheet 2

*Fig. 3.*

THE MEISTERSINGER PRELUDE
RICHARD WAGNER
VICTOR 6651

MEISTERSINGER MOTIVE

FULL ORCH.
A RESTATEMENT OF THIS THEME IN F MAJOR.
WE NEXT HEAR A ROMANTIC THEME SUGGESTING
THE LOVE OF WALTHER AND EVA, ALTERNATING
BETWEEN FLUTE, OBOE, AND CLARINET

LOVE'S ANGUISH

VIOLIN, OBOE, FLUTE.
SUCCEEDING THIS, WE HEAR THE LOVE
THEME GIVEN OUT BY THE 'CELLOS WHICH
CLOSES THIS SIDE OF THE RECORD.

INVENTOR.
WILLIAM OTTO MIESSNER
BY
ATTORNEY

Patented July 13, 1943

2,324,315

UNITED STATES PATENT OFFICE 2,324,315

THEME FINDER

William Otto Miessner, Lawrence, Kans.

Original application November 26, 1938, Serial No. 242,467. Divided and this application February 12, 1941, Serial No. 378,586

2 Claims. (Cl. 283—1)

The present invention relates to theme finders, and, more particularly, to charts for theme finders adapted to be used in connection with phonograph and similar sound records to permit locating and charting the entire or selected portions of the record, such as themes of a musical composition, opera, instruction in foreign languages, or the like.

It is well known to those skilled in the art that phonograph and similar records are widely used for the enjoyment and appreciation of music and in the instruction of music and of languages. According to the conventional procedure, the person or student was provided with an instruction book or sheet containing information relating to the matter recorded. While listening to the record being reproduced, the student would follow the visual and acoustical perception. This had the disadvantage that the student had to concentrate his attention both to the matter read and heard during the full length of the record, even though he desired to study only certain selected portions of the records, for example, certain musical themes in a musical composition or the correct pronunciation of certain selected words or sentences in a language record. If it was desired to repeat a certain portion of the matter recorded for closer and repeated study, it was generally necessary to repeat all of or the greater part of the record which caused great loss of time and efficiency and undue wear on the record. It has already been suggested to provide a theme finder in the form of a plate-like member having a longitudinally extending straight phonograph needle guiding slot enlarged at one end to receive a rotatable phonograph post or arbor. The portion of the member adjacent to said slot has been provided with graduations indicating the number of revolutions of the record or the number of minutes and seconds, the needle of the phonograph serving as a pointer. This device was simple and inexpensive and operated satisfactorily, but, of course, the accuracy obtainable was rather limited and the facility was limited and restricted. Another suggestion embodied a pointer member and a complicated mechanism which has been displaced by the movement of the tone arm of the phonograph by means of a complex mechanical connection. The pointer co-operated with a printed sheet or chart having certain legends thereon correlated to the record, so that during the reproduction process the pointer or indicator member successively pointed out the portions of the legend corresponding to the matter reproduced at that particular moment. This arrangement had the disadvantage of being complicated and expensive and beyond the means of the average student or person. Moreover, the load on the tone arm of the phonograph, caused by the complex mechanical transfer mechanism, was excessive and required specially constructed phonographs and tone arms. Of course, it was practically impossible to embody this mechanical principle into conventional phonographs or tone arms, but the whole phonograph had to be redesigned and manufactured specially. Although various other suggestions and attempts have already been made to solve the outstanding problem, none, as far as I am aware, of these various suggestions and attempts was completely satisfactory and successful when carried into practice on a practical and commercial scale.

I have discovered that the outstanding problem may be solved in a remarkably simple manner.

It is an object of the present invention to provide an improved theme finder which eliminates the disadvantages and inconveniences of conventional devices.

It is another object of the invention to provide a theme finder of novel and improved character which enables a person to follow the music easily and instantly in a progressive and continuous manner and which permits quick and accurate location of selected or predetermined portions of a record for the purpose of obtaining increased benefit or enjoyment from the recorded music or matter.

It is a further object of the invention to provide a weightless indicating element, such as a light beam and a suitable scale, or chart, co-operating therewith, for denoting the portion of the record being reproduced and which can be observed simultaneously by a large number of persons, for example by a number of persons in a living room or a number of students present in the same class room or an audience in a theatre.

Still another object of the invention is to provide a translucent chart or sheet for a phonograph having a theme finder associated therewith adapted to indicate the position of the tone arm on a record by means of a light beam projected onto the sheet, said sheet having a scale and descriptive matter correlated to the various portions of said scale printed thereon.

The invention also contemplates a chart containing legible intelligence to be correlated to the various portions of progressively reproduced acoustical matter, and a scale cooperating and integrally formed with said chart.

Other and further objects and advantages of the invention will become apparent from the following description taken in conjunction with the accompanying drawings in which:

Fig. 1 illustrates a scale calibrated in minutes and seconds for measuring the displacement of the tone arm on the record;

Fig. 2 depicts a chart bearing instructive or explanatory matter correlated to the readings on the scale; and Fig. 3 shows a chart bearing a scale and legible explanatory matter correlated to the various portions of said scale.

Broadly stated, according to the principles of my invention, I dispense with the conventional direct and mechanical connection between the tone arm and the pointer mechanism and employ an electrical or optical system. I have found that a light beam of suitable character is especially advantageous for use as a pointer which is displaced directly by and progressively with the displacement of the tone arm.

The structural details of these theme finder devices are more fully disclosed in my U. S. Patents Nos. 2,138,875 and my copending application Serial No. 242,467, to which reference is hereby made.

Referring now, more particularly, to Figs. 1 and 2 of the drawings, Fig. 1 depicts a scale which I prefer to use in connection with my theme finder devices, and Fig. 2 illustrates a typical chart containing the musical notation, the explanatory matter, a series of time indicia coordinated with the musical notation and explanatory matter and with other pertinent information. The scale has 5 main divisions representing minutes, four minutes being the average playing time of a standard twelve-inch record. Graduations indicating seconds are provided in between the main divisions. As has been explained hereinabove, the indicator light beam 1 in the form of a horizontally bisected disc or the shadow of the cross hair 2 in the projector member displaced in accordance with the displacement of the tone arm will accurately indicate on the scale the portion of the record being reproduced in terms of playing time or in minutes and seconds.

Fig. 2 illustrates, by way of example, a chart embodying the principles of my invention and containing explanatory matter correlated to a record. The top portion of the chart bears the title of the composition, for example, Third Movement, Fifth Symphony of Beethoven, the identifying name or number of the record, under which it is known and is obtainable in the trade, as, for example, "Victor 9031-A," and similar information. On the lower part of the chart, the principal themes of the composition in musical notation, such as the first theme and the second theme, appear. On the right side of the chart, numbers or indicia appear denoting the time in minutes and seconds from the time the reproduction has been started, to the time when the themes will appear. Thus, from the chart depicted in Fig. 2, it clearly appears that the first theme begins 16 seconds after starting the record, the second theme 44 seconds after the reproduction started. In this manner, by following the displacement of the indicating light beam on the illustrated scale, the sound sensations heard can be accurately coordinated with the description of the themes or other information contained on the chart and thorough understanding of the musical composition is made possible.

I have found that special advantages are obtainable by having the indicator light beam displaceable in the vertical direction rather than in the horizontal direction. A chart or sheet of suitable character is inserted in a window provided in the phonograph cabinet and is bearing a scale at the left margin thereof and has explanatory matter printed to the right of the scale. The reverse side of the sheet may contain a similar scale and the explanatory comments for the second side of the disk record. This chart is constituted of a translucent material such as paper, so that the bisected disc of light cast thereon by the optical system of the theme finder device can be readily observed by the student looking at the other or face side of the sheet. By proper adjustment of the linkage between the tone arm of the phonograph and the light beam reflecting means, the system is so adjusted that in the initial position of rest of the tone arm, the bisected disc of light is projected onto the top or zero line of the scale and is gradually descending during the rotation of the record at all times accurately indicating the position of the tone arm. In view of the fact that both the scale and the explanatory matter printed upon the chart are read downwardly, and the portions of the explanatory matter are directly connected by means of lead lines with the corresponding portions of the scale, the student can easily and accurately correlate the legible intelligence or other explanatory matter to the acoustical reproduction. Of course, the window or opening is of such character that the chart may be readily replaced with another one every time the phonograph record is changed. The reading of the explanatory matter may be facilitated by providing a suitable opaque shield which covers the portion of the back face of the chart bearing the explanatory matter but does not interfere with the projection of the indicator light beam onto the margin of the back face of the chart.

The external appearance and the operation of the chart embodying the principles of the present invention will be best understood from Fig. 3. It will be noted that the chart has a heading 3 which bears the title and other identifying characteristics of the record to which the chart in question is correlated. On the left side of the chart is provided a vertical scale 4 divided in minutes and in seconds upon which moves during the reproduction of the record a bisected disc of light 5 in accordance with the displacement of the tone arm upon the phonograph record. The two halves of the bisected disc may be in different colors if desired, for example, by providing a suitable color filter in the optical system. The right side of the chart bears explanatory matter coordinated to the acoustical matter. Lead lines 6 directly connect the various portions of the explanatory matter to the corresponding portions of the scale so that the student has no difficulty in correlating the matter read to the matter heard at any time during the reproduction of the record. After the reproduction of the record has been completed, the chart is replaced with a corresponding other chart simultaneously with the replacement of the record.

The arrangement described in the foregoing may be used by a group of students simultaneously, particularly if the chart is observed through a suitable magnifying glass mounted in front of the window in a suitable position. However, when it is desired to provide instruction for a large number of students or for the members of a large audience simultaneously, a small projector may be provided adapted to project a greatly enlarged image of a slide or film onto a projection screen This slide contains a greatly reduced photographic representation of the chart to be correlated to the record in question. The size and the general location of the enlarged image on the projection screen is so adjusted that an indicator light beam displaced in accordance with the displacement of the tone arm on a record will play upon the scale forming part of the projected chart whereas the explanatory matter contained on the other side of the projected chart is readily visible and legible by any member of the audience. Of course, as those skilled in the art will have no difficulty in understanding, during the reproduction of the record, the projected image of the chart will remain stationary and the beam of light will travel along the same as the reproduction proceeds. Thus, a large audience is able to follow both the acoustical matter heard and the legible intelligence seen on the projected chart and to directly and immediately correlate the corresponding portions thereof to each other. Of course, the great instructive value of this procedure is not restricted to the teaching and appreciation of music but provides equally valuable results in the teaching of languages, of science, and the like. A slide is provided for each phonograph record to be reproduced and each slide is replaced with a corresponding new slide when the record is replaced with a new record. Obviously, instead of a plurality of slides a single film of suitable length may be employed bearing photographically reduced images of various charts pertaining to a set or series of records in proper sequence.

The method and the devices according to the present invention solves a problem which is almost as old as the musical art. Music, the so-called "universal language," is necessarily less direct than speech in conveying meaning to the listener. It can appeal pleasurably to the physical senses through suggesting rhythmic movements, as in the many forms of the dance; it can arouse, by unconscious association, certain feelings or emotions; again, it can, by conscious association, portray fairly definite descriptions or characterizations of objective situations that stimulate the imagination or poetic fancy; and finally, it can appeal to the intellect by evoking abstract thought through its structural design.

Dance music requires no guide, although it is helpful to know the national traits of the people to whom certain dances are indigenous, the pace and the style of the movements, the measure and the characteristic rhythms peculiar to each. It is when he is asked to listen to music that is supposed to stir the emotions, or to stimulate the imagination, or to induce awareness of architectural relations that the layman is usually lost in a "sea of sound." Even though the program handed him at an orchestral concert may tell him what he is supposed to hear, it cannot tell him when any given event or situation will take place. Likewise, the analytical notes usually supplied with albums of recorded symphonic music tell the purchaser in vague terms what he should hear, but give him only approximate clues as to when the themes begin or where they may be "spotted" on each record.

The would-be musical connoisseur is left as helpless as an art lover who might look for a certain painting in an art museum where, to be sure, a printed guide is furnished, but where no gallery and not a single painting bears a distinguishing number, label or title. Just so, the music lover needs a guide to identify the significant musical themes when he attempts to penetrate the depths of musical art.

Since familiarity is one key to the understanding of music, the phonograph offers an ever-ready opportunity to hear the great masterworks repeatedly. It would seem a foregone conclusion, therefore, that many more intelligent persons would grasp the means offered by recorded music to acquaint themselves with it, provided that it were made possible for them to recognize the themes when and as they listen to them, and to know them intimately by repeated hearings. In the absence of an informed personal guide, it is practically impossible for any layman to recognize with certainty most of the important situations, pictures or moods in a complicated piece of symphonic music. It is almost equally important for the truly appreciative listener to recognize the main divisions of a classical symphony. Likewise, even habitual concert-goers have difficulty in distinguishing the tones of the more unusual instruments, and some of the manipulated tone qualities, such as harmonics, stopped tones, etc. A new satisfaction is obtained when all of these distinctive structural and qualitative elements of music are identified for the listener, and a still greater pleasure awaits him when he can recognize them unaided. To make possible and to facilitate this fuller understanding and this deeper insight into the essence of musical composition by means of the devices and charts described hereinabove, is the principal problem contemplated and solved by the principles of the present invention.

It is to be noted that the charts embodying the principles of the present invention provide a number of important advantages. First of all, a novel and extremely efficient device is provided which permits exact determination of the position of the tone arm on a phonograph record any time during the reproduction process.

It is also to be observed that the charts contemplated by my invention are very simple in construction and inexpensive to manufacture on a commercial scale.

Moreover, the indications provided on the scale of my improved theme finder are of such size and character, that they are easily discernible by a large number of persons in the same room or class, so that the instruction may simultaneously benefit all persons or students present in a class, lecture hall or theatre.

Furthermore, I provide an improved chart bearing musical notations and description of the themes of a musical composition with indications in minutes and seconds to enable the student to correlate acoustical instruction obtained by listening to the record, to the visual instruction obtained from the chart.

Although I have described my invention in connection with a few preferred embodiments thereof, various modifications may be resorted to by those skilled in the art without departing from the principles of the present invention. I consider all of these variations and modifications within the true spirit and scope of the present invention as disclosed in the present specification and defined by the appended claims.

The present invention is a division of my co-pending application, Serial No. 242,467 filed November 26, 1938.

I claim:

1. As a new article of manufacture, a chart operable when simultaneously and selectively subjected to the effect of front illumination and of rear illumination constituted of sheet material sufficiently opaque to render matter appearing thereon readily discernible when subjected to front illumination but being sufficiently translucent to indicate the presence of an indicating light beam projected onto the back side thereof on a portion of other matter appearing thereon, said last-named matter including a substantially vertical scale on one of the marginal portions of said chart, and said first-named matter including legible intelligence pertaining to a sound record and lead lines correlating portions of said intelligence to portions of said scale whereby the rear-illuminated matter will automatically indicate portions of the front-illuminated matter pertaining thereto.

2. As a new article of manufacture, a theme finder chart operable when simultaneously and selectively subjected to the effect of front illumination and of rear illumination constituted of sheet material sufficiently opaque to render matter appearing thereon readily discernible when subjected to front illumination but being sufficiently translucent to render other matter appearing thereon readily discernible when subjected to rear illumination; a vertical scale on one of the marginal portions of said sheet, legible informative matter pertaining to one side of a sound record, and lead lines for correlating portions of said legible matter to portions of said scale, all on one face of said sheet; and a similar scale, legible informative matter pertaining to the other side of said sound record, and corresponding lead lines, all in reversed position and on the other face of said sheet; said scales being adapted to selectively cooperate with an indicator beam of light projected to the respective back side of the sheet to indicate predetermined portions of said informative matter.

WILLIAM OTTO MIESSNER.